No. 860,212. PATENTED JULY 16, 1907.
W. A. HAZELBAKER.
BURIAL VAULT.
APPLICATION FILED AUG. 2, 1906. RENEWED JUNE 19, 1907.

Inventor
W. A. Hazelbaker

Witnesses

UNITED STATES PATENT OFFICE.

WESLEY ALONZO HAZELBAKER, OF OTWAY, OHIO.

BURIAL-VAULT.

No. 860,212.     Specification of Letters Patent.     Patented July 16, 1907.

Application filed August 2, 1906, Serial No. 328,915. Renewed June 19, 1907. Serial No. 379,799.

*To all whom it may concern:*

Be it known that I, WESLEY ALONZO HAZELBAKER, a citizen of the United States, residing at Otway, in the county of Scioto and State of Ohio, have invented certain new and useful Improvements in Burial-Vaults; and I do hereby declare the following to be a full, clear, and exact description of the invention, such as will enable others skilled in the art to which it appertains to make and use the same.

My invention relates to new and useful improvements in burial vaults, and more particularly to that class adapted to be formed of a combination of cement and metal.

My object is to provide means whereby the metal portions of the vault will be greatly reinforced by means of cement or other plastic material.

A further object is to provide means for transporting the vault from place to place after the parts thereof have been assembled.

Other objects and advantages will be hereinafter referred to and more particularly pointed out in the claims.

Figure 1:
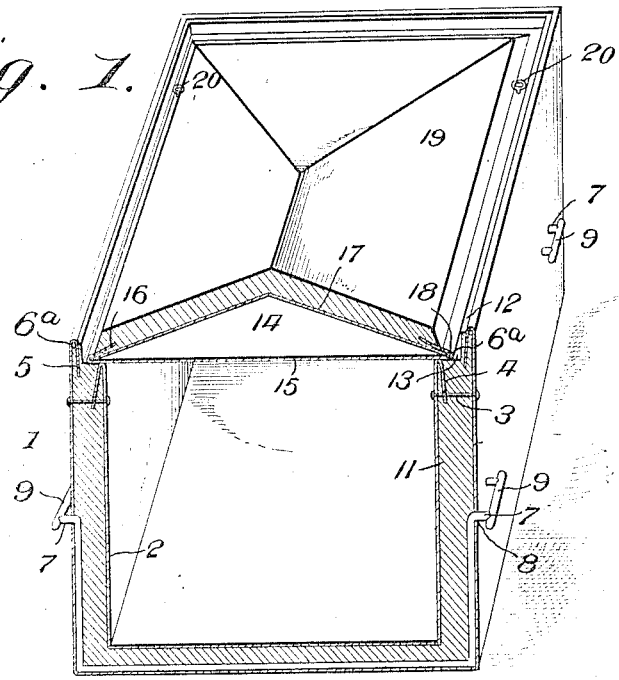
Figure 2:
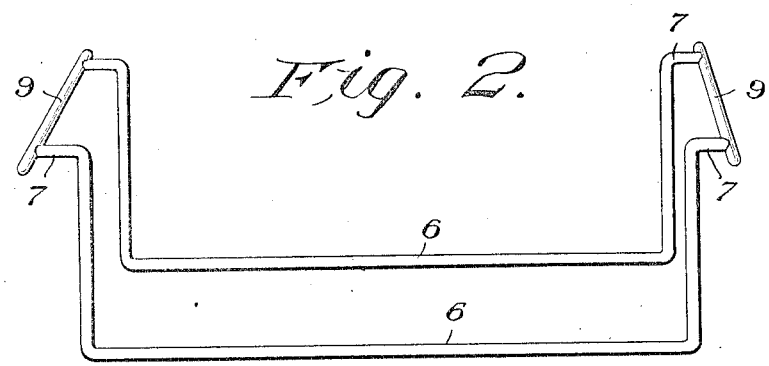
Figure 3:
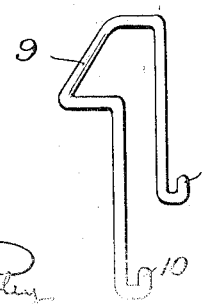

Referring to the drawings which are made a part of this application: Figure 1 is a perspective view partly in section of my improved vault. Fig. 2 is a perspective view of one form of handle and reinforcing device employed in connection with my improved vault, and Fig. 3 is a perspective view of a slightly modified form of handle.

Referring to the drawings in which similar reference numerals designate corresponding parts throughout the several views, 1 and 2 indicate respectively the outer and inner casings preferably constructed of metal, such as sheet steel or the like, the casing 2 being disposed within the casing 1 in such position as to form a channel between the casings, the casing 2 being held in position by means of rivets, bolts or the like 3, the extreme upper end of the casing 2 being directed outwardly and downwardly to form a flange 4, said flange being of sufficient length to be engaged by the rivets 3.

The walls of the outer casing 1 are directed above the upper edge of the casing 2, and has its upper free edge bent inwardly, forming a flange 5 and disposed around the upper edge of the casing 1, and between the walls of the casing and the flange 5 is a reinforcing wire 6ᵃ. A plurality of substantially U-shaped rods 6 are disposed within the casing 1 and rest upon the floor thereof, the upper ends of said rods being provided with lateral extensions 7 which are adapted to be directed through openings 8 in the side walls of the casing.

As best shown in Fig. 2, the rods 6 are preferably assembled in pairs, and each pair has secured to the lateral extensions 7 a handle 9, and it will be understood that said handles may be secured to the lateral extensions in any preferred way, the handles being secured to the extensions after the rods have been placed within the casing 1. By this construction it will be seen that in conjunction with providing handles for the convenience of transporting the vault, I have provided a reinforcing means for the lower portion of the vault, the rods 6 adding rigidity to the casing.

In Fig. 3 of the drawing, I have shown a slightly modified form of handle, in that the handle proper 9 is formed integral with the lateral extensions 7, and the horizontal portion of the rods 6 are dispensed with and the vertically disposed portion of the rods provided with hooked terminals 10, and it will be clearly understood that by dispensing with the horizontal portion of the rods 6, that the handles 9 may be formed integral with the vertical portions of the rods 6 and the rods inserted through the openings 8 in the side of the casing at any time. After the rods have been properly placed within the casing 1 and the casing 2 has been secured within the casing 1 by means of the rivets 3, a quantity of plastic material 11, such as cement or the like is poured between the outer and inner casing until the space around the casing 2 is filled to the upper edge of the casing, a layer 12 of the cement being directed upwardly along the face of the flange 5.

The upper edge of the casing 2 and the plastic material on a line therewith form a shoulder 13 around the casing 2, upon which is adapted to be disposed a suitable lid or cover 14, said cover comprising a horizontally disposed strip of metal 15 having its free ends directed upwardly and inwardly to form a flange 16, and the horizontally disposed strip has disposed thereon an arch section of metal 17, the edges of the arch section 17 being disposed between the horizontal strip 15 and the flange 16. A reinforcing wire 18 is directed around the edges of the cover 14 and is disposed in the angle formed between the horizontal strip 15 and flange 16. The arch section 17 of the cover 14 is preferably overlaid with a thickness of plastic material 19, and as best shown in Fig. 1 of the drawing, it will be seen that the flange 16 extends into the plastic material 19, thereby forming a water-tight joint between the horizontal strip 15 and the arched section 17.

When the cover 14 is placed in position upon the shoulder 13 a groove is formed between the cover and the upwardly extending edge of the casing 1, in which is deposited a sufficient quantity of plastic material to entirely fill the groove, thereby thoroughly sealing the vault and making the same water-proof.

As seen in Fig. 1 of the drawing, the flanges 4 and 5 are so disposed that they will be engaged by the plastic material 11 and thereby prevent water from passing in between the walls of the casings and the plastic material disposed therebetween.

For convenience in handling the cover 14 and lowering the same into position upon the vault, I have provided a plurality of eyes 20, said eyes being secured to the arched section 17 in any perfect manner, and are entirely covered over with plastic material when the groove between the cover and casing is filled.

It will now be seen that I have provided a very cheap and durable form of vault, and one that can be made perfectly water-tight.

It will be further understood that the metallic parts of the vault may be painted or otherwise coated with any suitable material to protect the same from dampness and prolong the life thereof.

What I claim is:

1. In a burial vault, the combination with an inner and outer casing having flanged sections at their upper end and plastic material disposed between said casings; of rods within the outer casing, lateral extensions at the ends of said rods, said rods being grouped in pairs and handles secured to the outer ends of said lateral extensions.

2. In a burial vault, the combination with an outer casing; of an inner casing, the vertical walls of which are of less height than the walls of the outer casing, means to secure the inner casing within the outer casing and spaced therefrom, plastic material disposed between the inner and outer casings, downwardly directed flanges at the upper ends of said casing and adapted to be engaged by said plastic material, and a cover for said vault.

3. In a vault of the class described, the combination with casings and plastic material between said casings, of rods assembled in pairs, lateral extensions at the upper ends of said rods and handles secured to said extensions.

4. In a vault of the class described, the combination with an outer casing having a flange at its upper end; of an inner casing of less height than the outer casing, secured within the outer casing and plastic material between said casings, the upper edge of which is disposed parallel with the upper edge of the inner casing to form a shoulder, and a cover adapted to rest on said shoulder.

5. In a vault of the class described, the combination with a pair of casings having plastic material there between; of a cover for said casing, said cover comprising a horizontal strip having upwardly and inwardly-directed flanges at each edge thereof, a metallic arched section above said horizontal strip, and plastic material disposed over said arched section and engaging said flanges.

In testimony whereof I have signed my name to this specification in the presence of two subscribing witnesses.

WESLEY ALONZO HAZELBAKER.

Witnesses:
J. MILT WILLIAMS,
R. R. WOLFORD.